US010883295B2

(12) United States Patent
Turcatti et al.

(10) Patent No.: US 10,883,295 B2
(45) Date of Patent: Jan. 5, 2021

(54) DOOR SYSTEM

(71) Applicant: ISAF BUS COMPONENTS S.R.L., Varese (IT)

(72) Inventors: Gianni Turcatti, Varese (IT); Massimo Sessa, Varese (IT)

(73) Assignee: ISAF BUS COMPONENTS S.R.L., Varese (IT)

( * ) Notice: Subject to any disclaimer, the term of this patent is extended or adjusted under 35 U.S.C. 154(b) by 194 days.

(21) Appl. No.: 16/083,406

(22) PCT Filed: Mar. 7, 2017

(86) PCT No.: PCT/IB2017/051312
§ 371 (c)(1),
(2) Date: Sep. 7, 2018

(87) PCT Pub. No.: WO2017/153904
PCT Pub. Date: Sep. 14, 2017

(65) Prior Publication Data
US 2019/0100952 A1    Apr. 4, 2019

(30) Foreign Application Priority Data
Mar. 7, 2016 (EP) ..................................... 16159034

(51) Int. Cl.
*E05D 15/10* (2006.01)
*E05F 15/632* (2015.01)
(Continued)

(52) U.S. Cl.
CPC .......... *E05D 15/1068* (2013.01); *B60J 5/062* (2013.01); *E05F 15/632* (2015.01); *E05F 15/565* (2015.01); *E05Y 2900/51* (2013.01)

(58) Field of Classification Search
CPC .. E05Y 2900/51; B60J 5/062; E05D 15/1068; E05D 2015/1055; B61D 19/008; E05F 15/632; E05F 15/565
See application file for complete search history.

(56) References Cited

U.S. PATENT DOCUMENTS 4,495,729 A * 1/1985 Britzke .................... B60J 5/062
   49/212
4,924,625 A * 5/1990 Dilcher .................. B61D 19/02
   49/212
(Continued)

FOREIGN PATENT DOCUMENTS

DE  20 2013 100 356 U1  4/2014
EP       0 320 591 A2    6/1989
EP       1 767 427 A1    3/2007

OTHER PUBLICATIONS

International Search Report and Written Opinion of the International Searching Authority for International Patent Application No. PCT/IB2017/051312 dated Apr. 11, 2017, 10 pages.

*Primary Examiner* — Justin B Rephann
(74) *Attorney, Agent, or Firm* — Merchant & Gould P.C.

(57) ABSTRACT

A door system (1) includes a door leaf (3) for closing off an entrance opening (4) and a suspension rod (10) having two opposite ends (11, 12) supported by a support structure (13). A suspension member (14) connects the door leaf (3) to the suspension rod (10) and can slide together with the door leaf (3) along the suspension rod (10) from an initial position corresponding to a closed position of the door leaf (3), to a final position corresponding to an open position of the door leaf (3). The two opposite ends (11, 12) of the suspension rod (10) are slidable in a horizontal direction transverse to the entrance opening (4). The suspension member (14) is slidably coupled to and guided by a non-linear upper guide (17) positioned above the suspension rod (10).

12 Claims, 7 Drawing Sheets

(51) Int. Cl.
*B60J 5/06* (2006.01)
*E05F 15/56* (2015.01)

(56) References Cited

U.S. PATENT DOCUMENTS

| | | | | |
|---|---|---|---|---|
| 5,253,452 A * | 10/1993 | Goldbach | ................ | B60J 5/062 |
| | | | | 49/212 |
| 5,263,280 A * | 11/1993 | Dilcher | ................ | B61D 19/009 |
| | | | | 49/212 |
| 5,271,181 A * | 12/1993 | Pietro | ..................... | B60J 5/062 |
| | | | | 49/118 |
| 5,893,236 A * | 4/1999 | Krbec | ................... | B61D 19/008 |
| | | | | 49/118 |
| 6,282,970 B1 * | 9/2001 | Oakley | ................ | E05F 15/652 |
| | | | | 74/89.14 |
| 6,539,669 B1 * | 4/2003 | Heidrich | ............. | B61D 19/008 |
| | | | | 49/120 |
| 6,684,567 B2 * | 2/2004 | Heidrich | ............. | B61D 19/008 |
| | | | | 49/213 |
| 10,119,319 B2 * | 11/2018 | Ritt | ........................ | B61D 19/02 |
| 2006/0225357 A1 * | 10/2006 | Bortoluzzi | .......... | E05D 15/1042 |
| | | | | 49/213 |
| 2008/0231083 A1 * | 9/2008 | Smink | ................... | E05F 15/565 |
| | | | | 296/202 |
| 2016/0046176 A1 * | 2/2016 | Prevost | ................. | B60J 5/0477 |
| | | | | 105/343 |

* cited by examiner

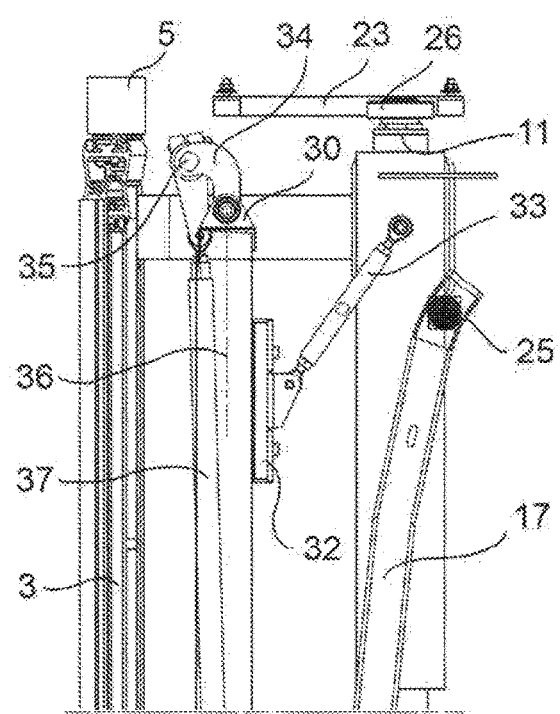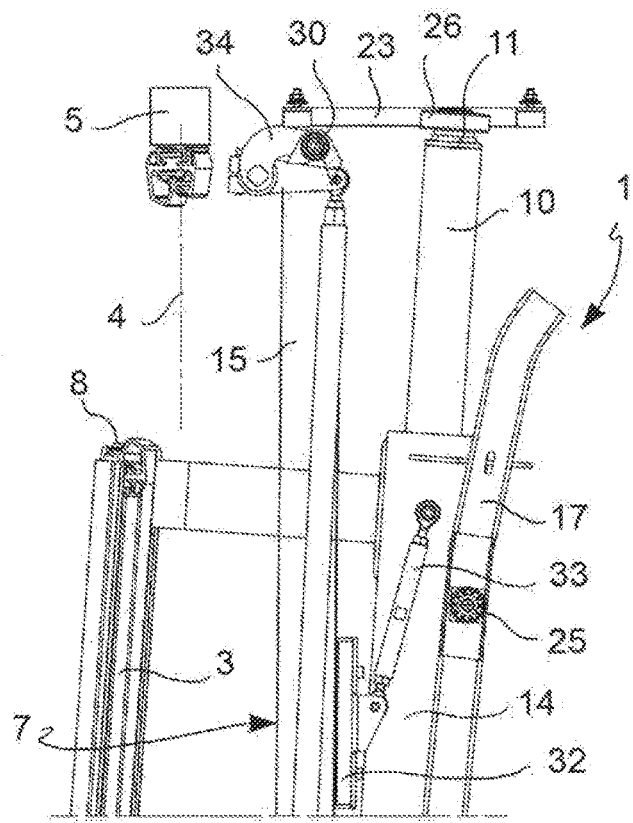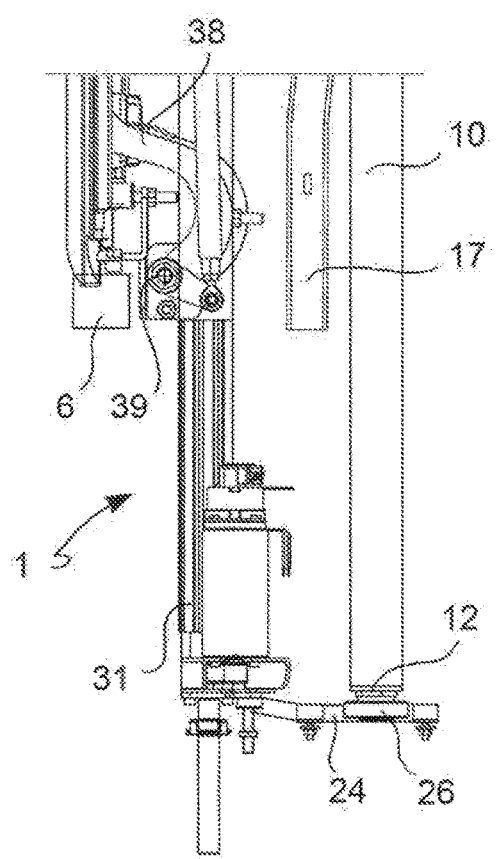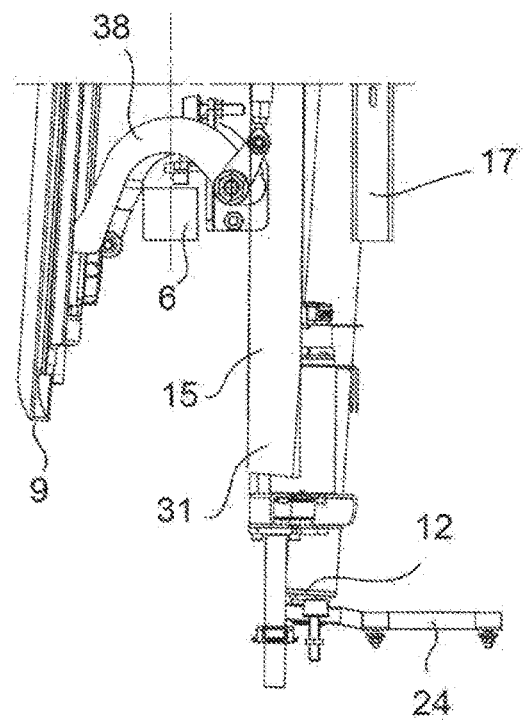
FIG. 10　　FIG. 11

DOOR SYSTEM

This application is a National Stage Application of PCT/IB2017/051312, filed 7 Mar. 2017, which claims benefit of European Patent Application Serial No. 16159034.4, filed 7 Mar. 2016 and which applications are incorporated herein by reference. To the extent appropriate, a claim of priority is made to each of the above-disclosed applications.

BACKGROUND OF THE INVENTION

The present invention relates to a door system comprising:
A) at least one door leaf for closing off an entrance opening, for instance that of a vehicle, wherein the entrance opening is at least defined by a first doorpost and a second doorpost, wherein the door leaf has a first side and a second side, wherein in a situation where the entrance opening is closed off, the door leaf is situated between the first and second doorpost, the first side of the door leaf is situated near the first doorpost and the second side of the door leaf is situated near the second doorpost,
B) a displacement system for moving the door leaf between a first position and a second position, wherein in the second position the door leaf provides access to the entrance opening.

Such a door system is generally known in the art, for instance with vehicles, such as buses.

SUMMARY OF THE INVENTION

The object of present invention is to provide an improved door system that, by means of a relatively simple construction (with relatively few components), combines a high degree of reliability with increased comfort for passengers entering a space via an entrance opening equipped with the door system. A further object of the invention is to improving the kinematic movement conditions of the door system with the aim to reduce stress peaks and to increase the service life of the mechanisms.

These and other objectives are achieved by a door system of claim 1. The dependent claims concern advantageous embodiments.

In accordance with an aspect of the invention, a door system (1) comprises:
A) at least one door leaf for closing off an entrance opening, for instance of a vehicle, the entrance opening being defined by at least a first doorpost and a second doorpost,
B) a displacement system for supporting and moving the door leaf between:
  a closed position, in which the door leaf is positioned in said entrance opening between the first and second doorpost and a first side edge of the door leaf is situated near the first doorpost and a second side edge of the door leaf is situated near the second doorpost, and
  an open position in which the door leaf provides access to the entrance opening, wherein the displacement system comprises:
  a suspension rod having two opposite ends supported by a support structure in a first suspension point on the side of the first doorpost and in a second suspension point on the side of the second doorpost,
  a suspension member that connects the door leaf to the suspension rod and that can slide together with the door leaf along the suspension rod between the first and second suspension points,
  an actuator operable to translate the suspension member along the suspension rod from an initial position corresponding to the closed position of the door leaf, to a final position corresponding to the open position of the door leaf,
C) a guide system configured to guide the door leaf from the closed position to the open position in:
  an initial phase of outward rotation of the door leaf in which the second side edge of the door leaf moves transversally away from said entrance opening and laterally beyond the second doorpost,
  a phase of lateral translation of the door leaf at least partially away from the entrance opening,
  a final phase of inward rotation of the door leaf in the opposite sense of the initial outward rotation,
characterized in that:
  each of said two opposite ends of the suspension rod is slidable in a horizontal direction transverse to the entrance opening, and
  the suspension member is slidably coupled to and guided by a non-linear upper guide rail arranged above the suspension rod.

Thus, a door system is provided that, by means of a relatively simple construction (with relatively few components), combines a high degree of reliability with increased comfort for those entering a space via an entrance opening equipped with the door system. In contrast to most known door systems that move fully outward during a first phase, with the door system according to the present invention predominantly only the second side of the door leaf moves outward during the first phase. The likelihood that a person positioned in front of the door system will be startled, or the amount of fright he/or she experiences when the door opens is thereby reduced.

The floating support of the suspension rod on both sides thereof and the direct guidance of the suspension member from above the suspension rod reduces mechanical constraining forces with respect to a fixed support, contributes to a smoother sequence of movement and, last but not least, allows for greater dimensional tolerances of the suspension system.

BRIEF DESCRIPTION OF THE DRAWINGS

The present invention will now be described in further detail by means of the drawings, in which.

DETAIL DESCRIPTION OF THE PREFERRED EMBODIMENTS

Figure 1:
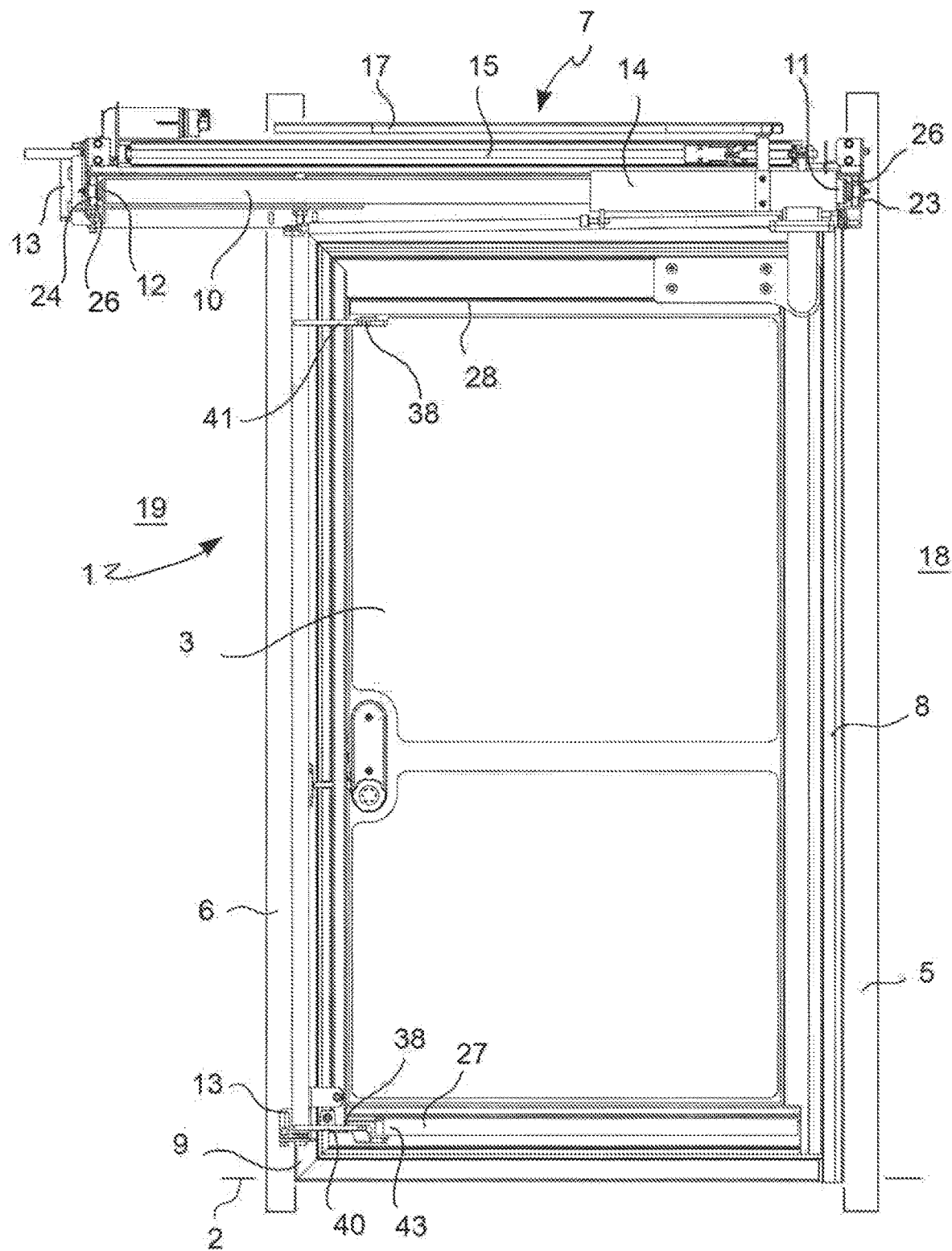
FIG. 1 shows a door system according to the invention.
Figure 4:
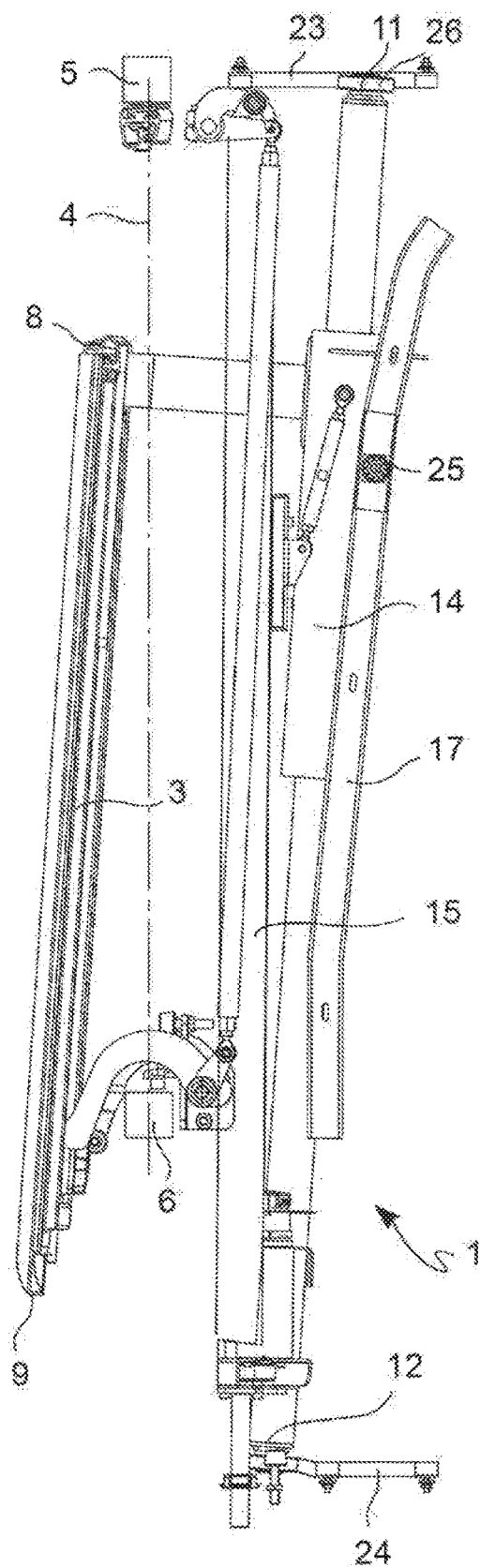
Figure 5:
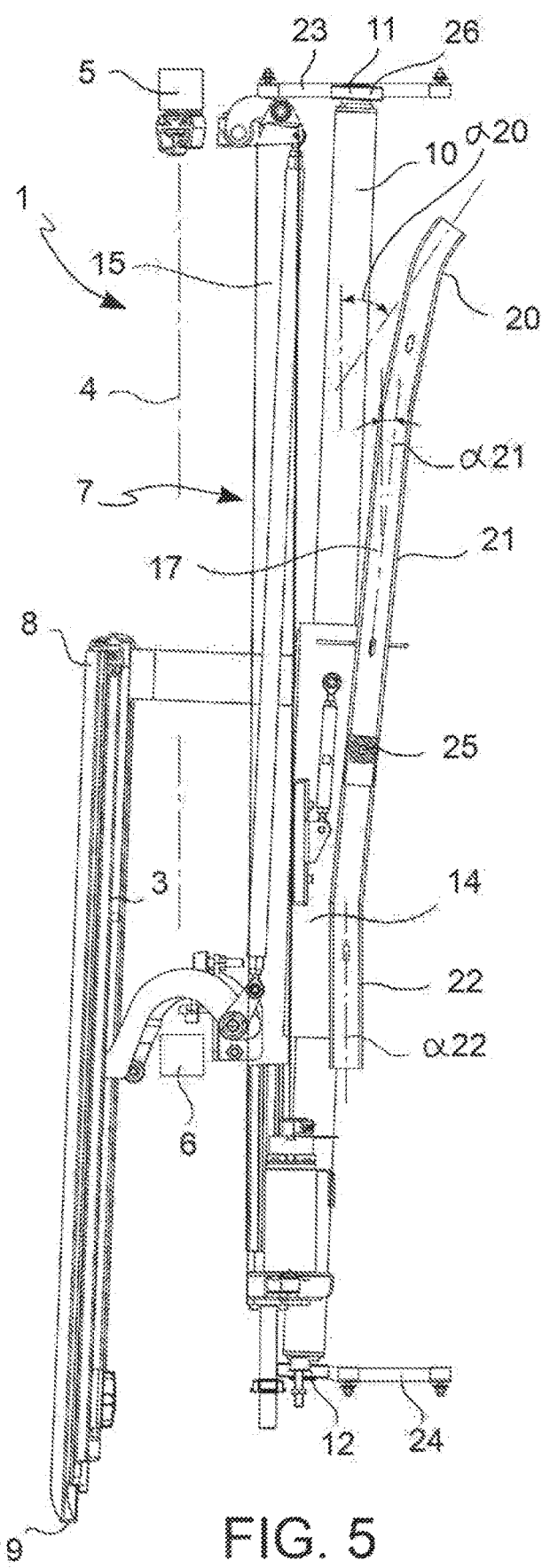
Figure 6:
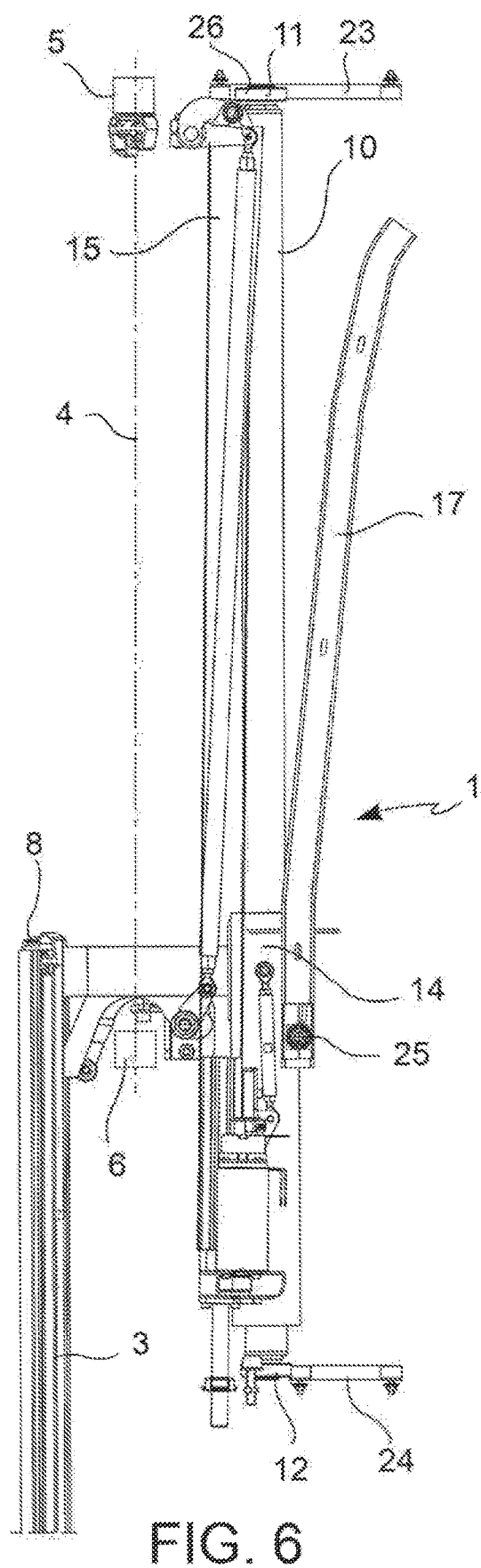
Figure 7:
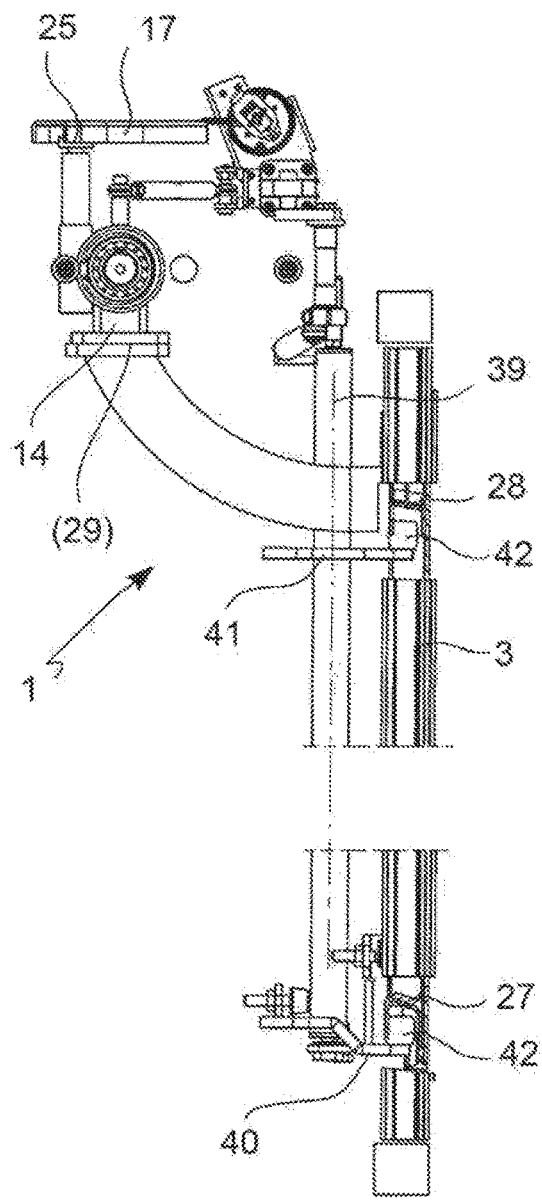
Figure 8:
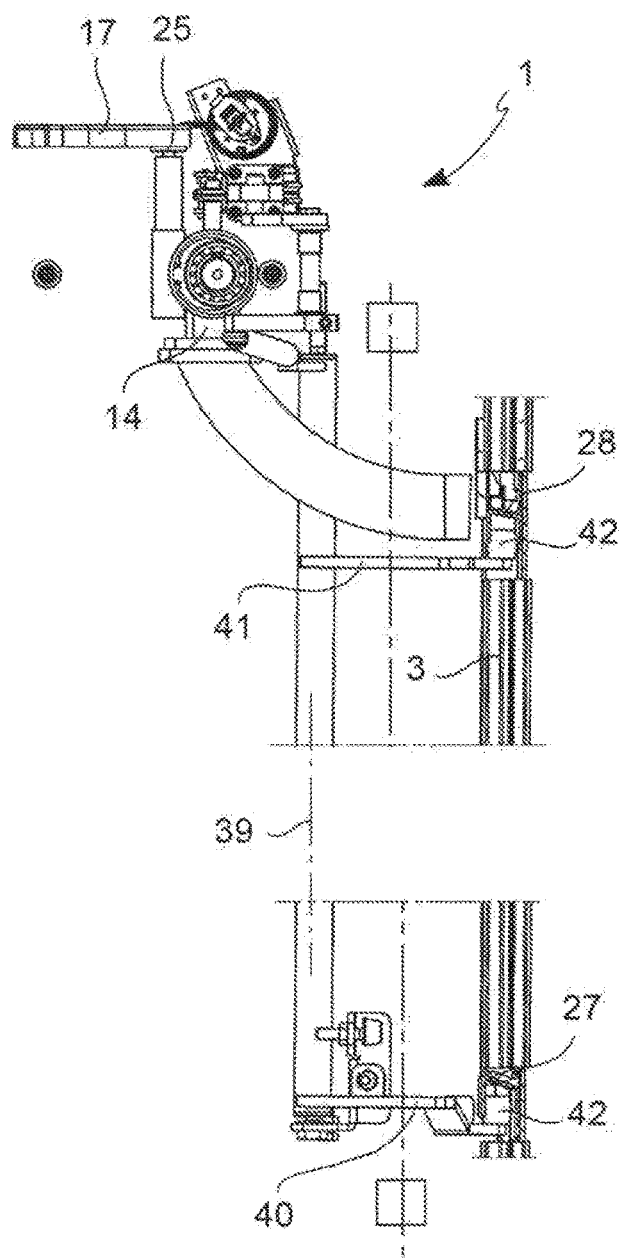
Figure 9:
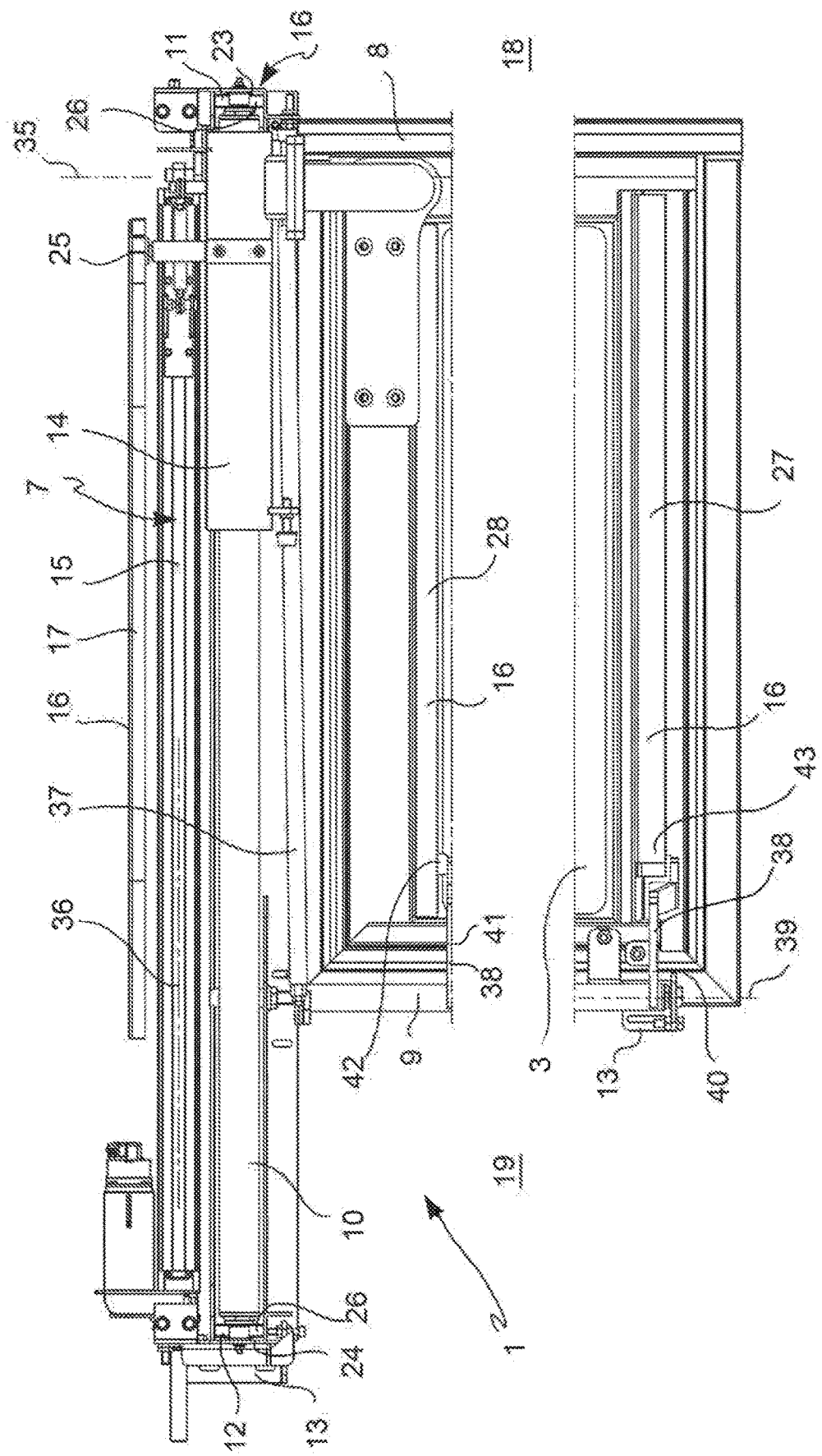
FIG. 9 is an enlarged view of an upper and lower region of the door system in FIG. 1,
FIGS. 10 and 11 are enlarged top plan views of a first side region and a second side region of the door system of FIG. 1, corresponding to the movement sequences of FIGS. 2 and 4.

With reference to the figures, a door system 1, e.g. for a passenger transport vehicle 2 or other application, comprises:

A) a door leaf 3 for closing off an entrance opening 4, for instance of a vehicle 2, the entrance opening 4 being defined by at least a first doorpost 5 and a second doorpost 6, B) a displacement system 7 for supporting and moving the door leaf 3 between:
- a closed position (FIGS. 1, 2), in which the door leaf 3 is positioned in said entrance opening 4 between the first 5 and second doorpost 6 and a first side edge 8 of the door leaf 3 is situated adjacent to the first doorpost 5 and a second side edge 9 of the door leaf 3 is situated adjacent the second doorpost 6, and
- an open position (FIG. 6), in which the door leaf 3 provides access to the entrance opening 4,
wherein the displacement system 7 comprises:
- a suspension rod 10 having two opposite ends 11, 12 supported by a support structure 13 in a first suspension point on the side of the first doorpost 5 and in a second suspension point on the side of the second doorpost 6,
- a suspension member 14 that connects the door leaf 3 to the suspension rod 10 and that can slide together with the door leaf 3 along the suspension rod 10 between the first and second suspension points,
- an actuator 15 operable to translate the suspension member 14 along the suspension rod 10 from an initial position corresponding to the closed position of the door leaf 3 (FIG. 2), to a final position corresponding to the open position of the door leaf 3 (FIG. 6) and vice versa, C) a guide system 16 configured to guide the door leaf 3 from the closed position to the open position in:
- an initial phase (FIGS. 2, 3) of outward rotation of the door leaf 3 in which the second side edge 9 of the door leaf moves transversally away from the entrance opening 4 and laterally beyond the second doorpost 6,
- a phase of lateral translation of the door leaf 3 (FIGS. 4, 5) at least partially away from the entrance opening 4,
- a final phase of inward rotation of the door leaf 3 (FIGS. 5, 6) in the opposite sense of the initial outward rotation.

In accordance with an aspect of the invention, each of said two opposite ends 11, 12 of the suspension rod 10 is slidable in a horizontal direction transverse to the entrance opening 4, and the suspension member 14 is slidably coupled to and guided by a non-linear upper guide 17 arranged above the suspension rod 10.

Advantageously, each of said two opposite ends 11, 12 of the suspension rod 10 can additionally rotate about a vertical rotation axis passing through said end 11; 12.

The expression "entrance opening 4" denotes a hypothetical surface extended from the first doorpost 5 to the second doorpost 6. In case of straight doorposts 5, 6 and/or that are both contained in a common plane, the expression "entrance opening 4" denotes this common plane defined and delimited by the first and second doorpost. In case of curved or mutually inclined doorposts 5, 6, the expression "entrance opening 4" denotes a correspondingly curved plane or curved hypothetical surface spanned between the first and second doorpost. According to the invention, the first and second suspension points are situated and can move in variable positions during the opening and/or closing movement of the door leaf 3 and determine a current translation direction of the door leaf 3.

Figures 2, 3:
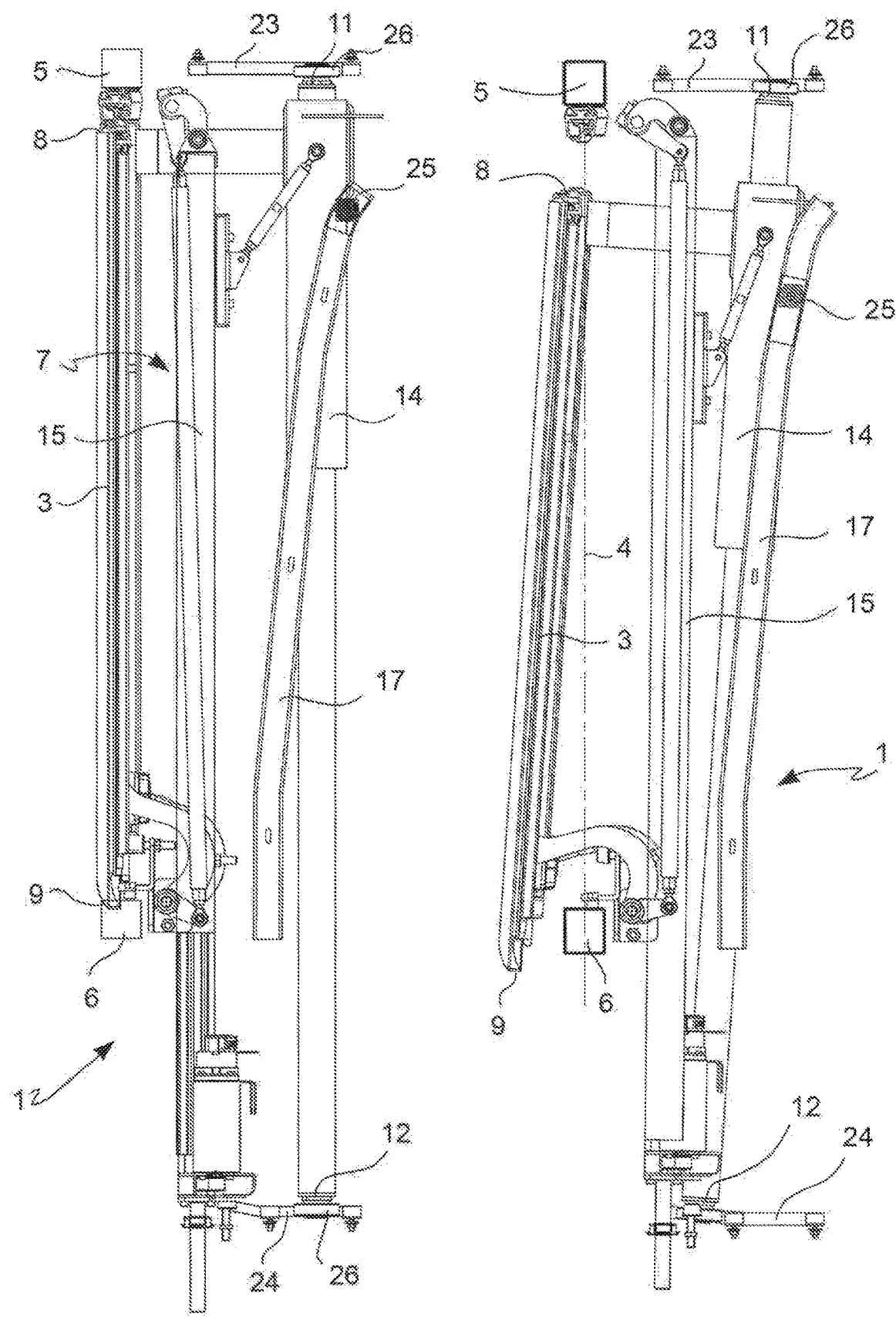
FIGS. 2, 3, 4, 5, 6 show a door leaf opening sequence in a top plan view of the door system of FIG. 1,
FIGS. 7, 8 show a door leaf closed position and fully open position corresponding to FIGS. 2 and 6, in a lateral view of the door system of FIG. 1.

In an embodiment, the upper guide 17 is preferably a fixed guide and fixed to the support structure 13. The upper guide 17 extends in a generally horizontal plane from the first side 18 of the door system 1 (where the first door post 5 is arranged) towards the second side 19 of the door system 1 (where the second door post 6 is arranged), while coming closer to the entrance opening 4 and converging towards a plane that is substantially parallel to the entrance opening 4 (FIG. 2).

An initial section 20 of the upper guide 17 (on the first side 18) defines with the entrance opening 4 an initial convergence angle α20 of e.g. 36° (or from 25° to 45°. A final section 22 of the upper guide 17 (on the second side 19) defines with the entrance opening 4 a final convergence angle α22 of e.g. 0° (or from 0° to 5°), and an intermediate section 21 of the upper guide 17 between the initial section 20 and the final section 22 defines with the entrance opening 4 an intermediate convergence angle α21 of e.g. 5° (or from 1° to 10°), wherein the intermediate convergence angle α21 is smaller than the initial convergence angle α20 and the final convergence angle α22 is smaller than the intermediate convergence angle α21.

This configuration facilitates the initial outward rotation and the final inward counter-rotation of the door leaf 3.

The upper guide 17 comprises preferably an overturned "U" profile, and may be engaged from below by an upper guide roller 25 or roller bearing connected, e.g. by a vertical post, with the suspension member 14.

The first and second ends 11, 12 of the suspension rod 10 are slidably or rollably supported by corresponding first and second lateral guides 23, 24 which extend horizontally and transversally to the entrance opening 4. The lateral guides 23, 24 may have an angular or "C" shape profile, and may be each engaged by a lateral guide roller 26 or roller bearing of the first and second ends 11, 12 of the suspension rod 10.

The second lateral guide 24 on the second side 19 may have a greater length than the first lateral guide 23 to enable the greater initial transverse outward movement of the door leaf 3 second side edge 9 with respect to the lesser initial movement of the door leaf 3 first side edge 8.

In an embodiment, the suspension member 14 may couple the suspension rod 10 and the door leaf 3 to the upper guide 17 in a manner that the upper guide 17 determines (only) the position of (a reference point of) the door leaf 3 in a horizontal suspension plane, but not also a rotational orientation of the door leaf 3 about a vertical axis with respect to the entrance opening 4.

In this embodiment, one or more auxiliary guides 27, 28 can be provided that slidingly constrain the door leaf 3 to the support structure 13 in a manner to determine, possibly together with the upper guide, also the rotational orientation of the door leaf 3 about a vertical axis with respect to the entrance opening 4, in each position of the suspension member 14 along the suspension rod 10.

In a further embodiment, the suspension member 14 may slidingly couple the suspension rod 10 and the door leaf 3 to the upper guide 17 in a manner that the upper guide 17 determines the position of (a reference point of) the the door leaf 3 in a horizontal suspension plane, and also a rotational orientation of the door leaf 3 about a vertical axis with respect to the entrance opening 4.

In any case, the precisely desired door movement can be easily adapted to the shape and space requirements of a specific application, such as a bus or a train wagon, by appropriately shaping the non-linear upper guide 17 and, possibly, the auxiliary guide is 27, 28.

A possibly required rotation of the door leaf 3 with respect to the suspension rod 10 can be achieved by a rotation hinge 29 (allowing rotation about a vertical axis, but blocking all relative translations) arranged between the door leaf 3 and the suspension member 14. This rotation hinge 29 can be situated in the door leaf 3 itself, in the suspension member 14 or in a supporting arm which connects the door leaf 3 to the suspension member 14.

The first and second suspension points define the locations where a substantial part of or substantially all the weight of the door leaf 3 is transferred to the support structure 13 which in turn is mounted to the application, e.g. a passenger vehicle 2.

The actuator 15 is supported by the support structure 13 and has a first actuator end 30 on the side of the first doorpost 5 and a second actuator end 31 on the side of the second doorpost 6, as well as an actuation slider 32 connected to the suspension member 14 and movable along the actuator 15 to pull or push the suspension member 14 along the suspension rod 10.

The connection between the actuation slider 32 and the suspension member 14 can be embodied by a hinged connecting rod 33 adapted to compensate variable relative positions between the actuation slider 32 and the suspension member 14.

According to embodiments, the actuator 15 may comprise a linear actuator, e.g. a pneumatic or hydraulic cylinder-piston group or a motor having a threaded rotor, wherein the motor housing or a member threaded on the rotor forms the actuator slider.

In an embodiment, the displacement system 7 comprises a lever mechanism which is connected both to the first actuator end 30 and to an auxiliary guide system 27, 28 of the door leaf 3, and configured to push the door leaf 3 second side edge 9 transversally outward of and away from the entrance opening 4, in response to a backward movement of the first actuator end 30 opposite a forward movement of the actuator slider 32.

Such a backward movement of the first actuator end 30 is brought about due to an initial resistance of the door leaf 3 against moving out of its closed position and the resulting backward reaction force between the actuation slider 32 and the first actuator end 30, which moves the latter backward until it reaches a stop position.

The initial resistance of the door leaf 3 can be e.g. obtained by a curved initial blocking section 43 of the guide system, e.g. of the auxiliary guide/s 27, 28, the upper guide 17 or a further guide. Alternatively, the initial resistance can be obtained by an elastic spring force acting on the actuating slider 32 or by the inertial and frictional resistance of the door system 1.

After the backward movement of the first actuator end 30, and the resulting initial outward rotation of the door leaf 3, the actuating slider 32 continues its travel and carries the suspension member 14 along the suspension rod 10 and the door leaf 3 to the open position.

In an embodiment, the first actuator end 30 is connected to a first lever 34 which is movable around a first (vertical) rotation axis 35 (that is fixed with respect to the support structure 13 and on the first side 18 of the door system) at a distance from and transverse to a longitudinal axis 36 of the actuator 15, such that a longitudinal displacement of the first actuator end 30 results in a rotation of the first lever 34 around the first rotation axis 35.

The first lever 34 is connected by a pull-push rod 37 to a second lever 38 which is movable around a second (vertical) rotation axis 39 (that is fixed with respect to the support structure 13 and on the second side 19 of the door system) at a distance from the first rotation axis 35, and wherein the second lever 38 is connected to an auxiliary guide system 27, 28 of the door leaf 3.

A movement of the first actuator end 30 in a direction opposite the forward movement of the actuation slider 32 rotates the first 34 and second 38 levers such that the second lever 38 pushes the door leaf 3 second side edge 9 transversally outward of and away from the entrance opening 4.

The auxiliary guide system 27, 28 of the door leaf 3 may comprise a lower auxiliary guide rail 27 and an upper auxiliary guide rail 28 arranged in or mounted to the door leaf 3, wherein the second lever 38 comprises a lower lever arm 40 that engages the lower auxiliary guide rail 27 and an upper lever arm 41 that engages the upper auxiliary guide rail 28.

More generally, the guide system comprises one or more auxiliary guide rails 27, 28, arranged in the door leaf 3 or mounted to the door leaf 3 and engaged by one or more auxiliary guide rollers 42 or roller bearings connected to the support structure 13, preferably to the lever mechanism, more specifically to the second lever 38.

The auxiliary guide rollers 42 may be engaged by the lower and/or upper auxiliary guide rail 27, 28 and by the second lever 38 in a manner to not only impose a translational position of the door leaf 3, but also a rotational orientation thereof.

Thus, the movement trajectory of the door leaf 3 can be effectively defined with only little play.

In an embodiment, a curved initial blocking section 43 of the auxiliary guide rail 27, 28 near the second side edge 9 of the door leaf 3 is shaped in a manner that, during a displacement of the door leaf 3 into the closed position, the auxiliary guide roller's 42 force the second side edge 9 of the door leaf 3 inward against the second doorpost 6.

For the sake of simplicity of the description, the present invention has been described as a door system 1 comprising at least one door leaf 3. However, in practice sometimes door systems without door leafs are supplied to consumers. Therefore the invention also relates to a door sub-system that coincides with the door system 1 described above, except that the door leaf 3 is lacking, and that the door sub-system is suitable for being mounted together with a door leaf 3. Finally, the invention relates also to a vehicle 2 comprising the door system 1.

The invention claimed is:

1. A door system for a passenger transport vehicle, comprising:
A) a door leaf for closing off an entrance opening defined by at least a first doorpost and a second doorpost,
B) a displacement system for supporting and moving the door leaf between:
   a closed position in which the door leaf is positioned in said entrance opening between the first doorpost and the second doorpost and a first side edge of the door leaf is adjacent to the first doorpost and a second side edge of the door leaf is adjacent to the second doorpost, and
   an open position in which the door leaf provides access to the entrance opening,
   wherein the displacement system comprises:
      a suspension rod having two opposite ends supported by a support structure in a first suspension point on a side of the first doorpost and in a second suspension point on a side of the second doorpost,
      a suspension member that connects the door leaf to the suspension rod and that slides together with the door leaf along the suspension rod between the first suspension point and the second suspension point, an actuator operable to translate the suspension member along the suspension rod from an initial position corresponding to the closed position of the door leaf, to a final position corresponding to the open position of the door leaf, C) a guide system configured to guide the door leaf from the closed position to the open position comprising:
an initial phase of outward rotation of the door leaf in which the second side edge of the door leaf moves transversally away from the entrance opening and laterally beyond the second doorpost,
a phase of lateral translation of the door leaf at least partially away from the entrance opening,
a final phase of inward rotation of the door leaf opposite to the initial outward rotation,
wherein each of said two opposite ends of the suspension rod is slidable in a substantially horizontal direction transverse to the entrance opening, and the suspension member is slidably coupled to and guided by a non-linear upper guide positioned above the suspension rod;
wherein the upper guide is fixed with respect to the support structure and extends from a first side of the door system where the first door post is arranged to a second side of the door system where the second door post is arranged, thereby approximating towards the entrance opening and converging towards a plane substantially parallel to the entrance opening; and
wherein the upper guide forms:
an initial section on the first side that defines with the entrance opening an initial convergence angle,
a final section on the second side that defines with the entrance opening a final convergence angle, and
an intermediate section, between the initial section and the final section, that defines with the entrance opening an intermediate convergence angle,
wherein the intermediate convergence angle is smaller than the initial convergence angle and the final convergence angle is smaller than the intermediate convergence angle.

2. Door system according to claim 1, wherein each of said two opposite ends of the suspension rod rotates about a vertical rotation axis passing through said end.

3. Door system according to claim 1, wherein both the first suspension point and second suspension point move in variable positions during opening movement of the door leaf.

4. Door system according to claim 1, wherein the upper guide comprises an overturned "U" profile that is engaged from below by an upper guide roller connected to the suspension member.

5. Door system according to claim 1, wherein the ends of the suspension rod are slidably or rollably supported by corresponding first and second lateral guides which extend horizontally and transversally to the entrance opening.

6. Door system according to claim 1, wherein the suspension member couples the suspension rod and the door leaf to the upper guide so that the upper guide determines a position of a reference point of the door leaf in a horizontal suspension plane,
wherein one or more auxiliary guides slidingly constrain the door leaf to the support structure to determine, together with the upper guide, the rotational orientation of the door leaf about a vertical axis with respect to the entrance opening, in each position of the suspension member along the suspension rod.

7. Door system according to claim 6, wherein the auxiliary guide system comprises a lower auxiliary guide rail and an upper auxiliary guide rail formed in the door leaf, wherein said lever mechanism comprises a lever with a lower lever arm and an upper lever arm that engage the lower auxiliary guide rail and the upper auxiliary guide rail by one or more auxiliary guide rollers.

8. Door system according to claim 1, wherein the actuator is supported by the support structure and comprises:
a first actuator end on the side of the first doorpost and a second actuator end on the side of the second doorpost,
an actuation slider connected to the suspension member and movable along an actuator longitudinal axis between the first actuator end and the second actuator end to pull or push the suspension member along the suspension rod.

9. Door system according to claim 8, wherein the displacement system comprises a lever mechanism connected both to the first actuator end and to an auxiliary guide system of the door leaf, and configured to push the door leaf second side edge transversally outward of the entrance opening, in response to a backward movement of the first actuator end opposite a forward movement of the actuator slider during an initial phase of the movement of the door leaf from said closed position toward said open position,
wherein said backward movement of the first actuator end occurs due to an initial resistance of the door leaf to move out of said closed position and the resulting backward reaction force between the actuation slider and the first actuator end.

10. Door system according to claim 9, wherein said initial resistance of the door leaf is caused by a curved initial blocking section of the guide system.

11. A door system for a passenger transport vehicle, comprising:
A) a door leaf for closing off an entrance opening defined by at least a first doorpost and a second doorpost;
B) a displacement system for supporting and moving the door leaf between:
a closed position in which the door leaf is positioned in said entrance opening between the first doorpost and the second doorpost and a first side edge of the door leaf is adjacent to the first doorpost and a second side edge of the door leaf is adjacent to the second doorpost, and
an open position in which the door leaf provides access to the entrance opening,
wherein the displacement system comprises:
a suspension rod having two opposite ends supported by a support structure in a first suspension point on a side of the first doorpost and in a second suspension point on a side of the second doorpost,
a suspension member that connects the door leaf to the suspension rod and that slides together with the door leaf along the suspension rod between the first suspension point and the second suspension point,
an actuator operable to translate the suspension member along the suspension rod from an initial position corresponding to the closed position of the door leaf, to a final position corresponding to the open position of the door leaf;
C) a guide system configured to guide the door leaf from the closed position to the open position comprising:
an initial phase of outward rotation of the door leaf in which the second side edge of the door leaf moves transversally away from the entrance opening and laterally beyond the second doorpost, a phase of lateral translation of the door leaf at least partially away from the entrance opening, a final phase of inward rotation of the door leaf opposite to the initial outward rotation, wherein each of said two opposite ends of the suspension rod is slidable in a substantially horizontal direction transverse to the entrance opening, and the suspension member is slidably coupled to and guided by a non-linear upper guide positioned above the suspension rod;

wherein the ends of the suspension rod are slidably or rollably supported by corresponding first and second lateral guides which extend horizontally and transversally to the entrance opening; and wherein the lateral guides have an angular or "C" shape profile and are each engaged by a lateral guide roller of the ends of the suspension rod.

12. A door system for a passenger transport vehicle, comprising:

A) a door leaf for closing off an entrance opening defined by at least a first doorpost and a second doorpost;

B) a displacement system for supporting and moving the door leaf between:

a closed position in which the door leaf is positioned in said entrance opening between the first doorpost and the second doorpost and a first side edge of the door leaf is adjacent to the first doorpost and a second side edge of the door leaf is adjacent to the second doorpost, and an open position in which the door leaf provides access to the entrance opening, wherein the displacement system comprises:

a suspension rod having two opposite ends supported by a support structure in a first suspension point on a side of the first doorpost and in a second suspension point on a side of the second doorpost, a suspension member that connects the door leaf to the suspension rod and that slides together with the door leaf along the suspension rod between the first suspension point and the second suspension point, an actuator operable to translate the suspension member along the suspension rod from an initial position corresponding to the closed position of the door leaf, to a final position corresponding to the open position of the door leaf;

C) a guide system configured to guide the door leaf from the closed position to the open position comprising:

an initial phase of outward rotation of the door leaf in which the second side edge of the door leaf moves transversally away from the entrance opening and laterally beyond the second doorpost, a phase of lateral translation of the door leaf at least partially away from the entrance opening, a final phase of inward rotation of the door leaf opposite to the initial outward rotation, wherein each of said two opposite ends of the suspension rod is slidable in a substantially horizontal direction transverse to the entrance opening, and the suspension member is slidably coupled to and guided by a non-linear upper guide positioned above the suspension rod;

wherein the ends of the suspension rod are slidably or rollably supported by corresponding first and second lateral guides which extend horizontally and transversally to the entrance opening; and wherein the second lateral guide on the second side has a greater length than the first lateral guide to enable greater initial transverse outward movement of the door leaf second side edge with respect to lesser initial movement of the door leaf first side edge.

* * * * *